United States Patent [19]

Kobayashi et al.

[11] Patent Number: 5,106,558

[45] Date of Patent: Apr. 21, 1992

[54] METHOD FOR CONTINUOUS PREPARATION OF POLYETHYLENE MATERIAL HAVING HIGH STRENGTH AND HIGH MODULUS OF ELASTICITY

[75] Inventors: Keizo Kobayashi; Takashi Mizoe; Yoshimu Iwanami; Shigeki Yokoyama, all of Yokohama; Keiji Jimbo, Yokosuka; Kazuhiko Kurihara, Tokyo; Hiroshi Yazawa, Kunitachi; Mihoko Okada, Tokyo, all of Japan

[73] Assignees: Nippon Oil Co., Ltd.; Nippon Petrochemicals Co., Ltd.; Polymer Processing Research, all of Tokyo, Japan

[21] Appl. No.: 515,706

[22] Filed: Apr. 27, 1990

[30] Foreign Application Priority Data

May 2, 1989 [JP] Japan .................................. 1-113374

[51] Int. Cl.⁵ .............................................. B29C 43/22
[52] U.S. Cl. .................................. 264/119; 264/120; 264/126
[58] Field of Search ............... 264/119, 120, 123, 126, 264/210.1, 280, 288.4, 210.3, 211

[56] References Cited

U.S. PATENT DOCUMENTS

| | | | |
|---|---|---|---|
| 3,387,073 | 6/1968 | Larsen | 264/211 |
| 3,492,310 | 1/1970 | Carrow | 264/211 |
| 3,923,947 | 12/1975 | Cook | 264/211 |
| 4,612,148 | 9/1986 | Motooka et al. | 264/211 |
| 4,879,076 | 11/1989 | Sano et al. | 264/28 |
| 4,996,011 | 2/1991 | Sano et al. | 264/28 |
| 5,002,714 | 3/1991 | Sano et al. | 264/119 |

FOREIGN PATENT DOCUMENTS

| | | | |
|---|---|---|---|
| 253513 | 1/1988 | European Pat. Off. | |
| 58-164628 | 9/1983 | Japan | 264/211 |

Primary Examiner—Mary Lynn Theisen
Attorney, Agent, or Firm—Oblon, Spivak, McClelland, Maier & Neustadt

[57] ABSTRACT

A method for the continuous preparation of a polyethylene having high strength and high modulus of elasticity is here disclosed which comprises the steps of mixing 100 parts by weight of an ultra-high-molecular-weight polyethylene powder having an intrinsic viscosity of 5 to 50 dl/g in decalin at 135° C. with 2 to 50 parts by weight of a liquid organic compound having a boiling point higher than the melting point of the polyethylene, feeding the resulting mixture to between a pair of upper and lower endless belts facing each other, continuously compression-molding the mixture at a temperature less than the melting point of the mixture by pressing means disposed inside the endless belts, and rolling and then drawing the same.

24 Claims, 1 Drawing Sheet

METHOD FOR CONTINUOUS PREPARATION OF POLYETHYLENE MATERIAL HAVING HIGH STRENGTH AND HIGH MODULUS OF ELASTICITY

BACKGROUND OF THE INVENTION (a) Field of the Invention

The present invention relates to a method for the continuous preparation of a polyethylene material having high strength and high modulus of elasticity. More specifically, the present invention relates to a method for effectively preparing a polyethylene material having high strength and high modulus of elasticity by mixing a specific ultra-high-molecular-weight polyethylene powder with a specific liquid organic compound, then continuously compression-molding the mixture at a temperature less than a melting point of the mixture, and rolling and drawing the same.

(b) Description of the Prior Art

The so-called ultra-high-molecular-weight polyolefins having noticeably high molecular weights are excellent in impact resistance and wear resistance and have self-lubricating properties, and therefore they are used as characteristic engineering plastics in many fields. This ultra-high-molecular-weight polyolefin has a much higher molecular weight than a usual polyolefin, and thus it is expected that if the ultra-high-molecular-weight polyolefin can be orientated at a high level, a molded article having high strength and high modulus of elasticity will be obtained. Accordingly, various researches have been conducted on techniques of the high orientation.

However, the ultra-high-molecular-weight polyolefin has a higher melt viscosity than the usual polyolefin, and so presently the ultra-high-molecular-weight polyolefin cannot be molded successfully in an ordinary manner, and it is also impossible to accomplish high orientation by drawing.

Pole Smith, Bieter Yarn Remstora et al. have suggested the method of preparing a fiber having high strength and high modulus of elasticity by drawing, at a high magnification, a gel obtained from a decal in solution (dope) of an ultra-high-molecular-weight polyolefin (G.B. Laid-open No. 2051667). However, in this dope, the concentration of the polymer having a weight average molecular weight of 1,500,000 is as low as 3% by weight, and that of the polymer having a weight average molecular weight of 4,000,000 was also extremely low, 1% by weight. Therefore, in the practice of the above-mentioned method, a large amount of a solvent is used, which means that the suggested method is very inconvenient from economical viewpoints such as a preparation way and handling of the high viscous solution.

Furthermore, various suggestions have been made with regard to methods for the high drawing and high orientation of single crystal mats of the ultra-high-molecular-weight polyolefins [EP Publication No. 115192, Japanese Patent Laid-open Publication Nos. 15120/1985 and 97836/-1985, Kobunshi Gakkai Yokoushuu, Vol. 34, No. 4, p 873 (1985) etc.].

In these methods, however, the ultra-high-molecular-weight polyolefin is first dissolved in a solvent such as xylene, decalin or kerosine to prepare a dilute solution, the latter is then subjected to cooling and isothermic crystallization so as to form a single crystal mat, and the latter is further subjected to solid phase extrusion and drawing. Therefore, also in this method, there is still the problem that a considerable amount of the solvent must be used at the time of the formation of the single crystal mat.

For the purpose of solving the above-mentioned problem, the present inventors have suggested a method in which an ultra-high-molecular-weight polyolefin powder is compression-molded at a temperature less than the melting point of the powder without dissolving and melting it, followed by rolling and drawing, in order to obtain a polyolefin material having high strength and high modulus of elasticity (Japanese Patent Laid-open Publication No. 41512/1988 and EP Publication No. 253513).

As a result of further investigations, the inventors have found that the polyolefin material having high strength and high modulus of elasticity can be manufactured in a high production efficiency by continuously compression-molding an ultra-high-molecular-weight polyolefin powder through a specific device (at a temperature less than the melting point of the polyolefin powder), and then rolling and drawing the molded material. As for this technique, a patent application has already been filed (Japanese Patent Application No. 320401/1988).

As discussed above, the present inventors have suggested the means for continuously compression-molding an ultra-high-molecular-weight polyolefin powder under a relatively low pressure so as to form a sheet, and according to this method, the rolling of a subsequent process can work effectively, so that in the rolled sheet, the total draw ratio inclusive of a roll ratio can be enhanced, which largely contributes to the improvement of quality and the increase of productivity. In this method, however, the fine uniformity of pressure takes place sometimes in the compression molding step and this portion appears as a defect, and the pressure is released through opposite end portions of the sheet. For these reasons, Yield is poor, and production efficiency is also low. In such a defect portion in the compression-molded sheet and such ununiformed end portions of the sheet, rolling cannot be effected uniformly. If there is the defect portion in the sheet, a bank is formed inconveniently at the time of rolling, which deteriorates productivity and yield noticeably. In addition, when the sheet including the defect portion is drawn in a subsequent step in the continuous process, the draw ratio cannot be increased sufficiently and the yield is low.

OBJECTS AND SUMMARY OF THE INVENTION

One object of the present invention is to provide a method for continuously preparing a polyethylene material having high strength and high modulus of elasticity which can be compression-molded under a low pressure, when an ultra-high-molecular-weight polyolefin powder is compression-molded continuously by a specific device.

Another object of the present invention is to provide a method for preparing a substantially defect portion-free polyethylene material by the above-mentioned compression molding which can be rolled and drawn in a high draw ratio in subsequent steps.

Still another object of the present invention is to provide a method for preparing a high-quality polyethylene material in a high production efficiency and a high yield.

The objects of the present invention can be achieved by a method for the continuous preparation of a polyethylene having high strength and high modulus of elasticity which comprises the steps of mixing 100 parts by weight of an ultra-high-molecular-weight polyethylene powder having an intrinsic viscosity of 5 to 50 dl/g in decalin at 135° C. with 2 to 50 parts by weight of a liquid organic compound having a boiling point higher than the melting point of the polyethylene at a temperature less than the melting point of the polyethylene powder, feeding the mixture to between a pair of upper and lower endless belts facing each other, continuously compression-molding the mixture at a temperature less than the melting point of the mixture by the use of pressing means disposed inside the endless belts, while the mixture is sandwiched and moved by the endless belts, and rolling and then drawing the same; and a method for the preparation of a polyethylene material having high strength and high modulus of elasticity in which each of the aforesaid pressing means disposed inside the endless belts is composed of a pressing plate and a series of rotatable rollers linked to each other disposed between the pressing plate and the endless belt.

DETAILED DESCRIPTION OF THE INVENTION

Figure 1:
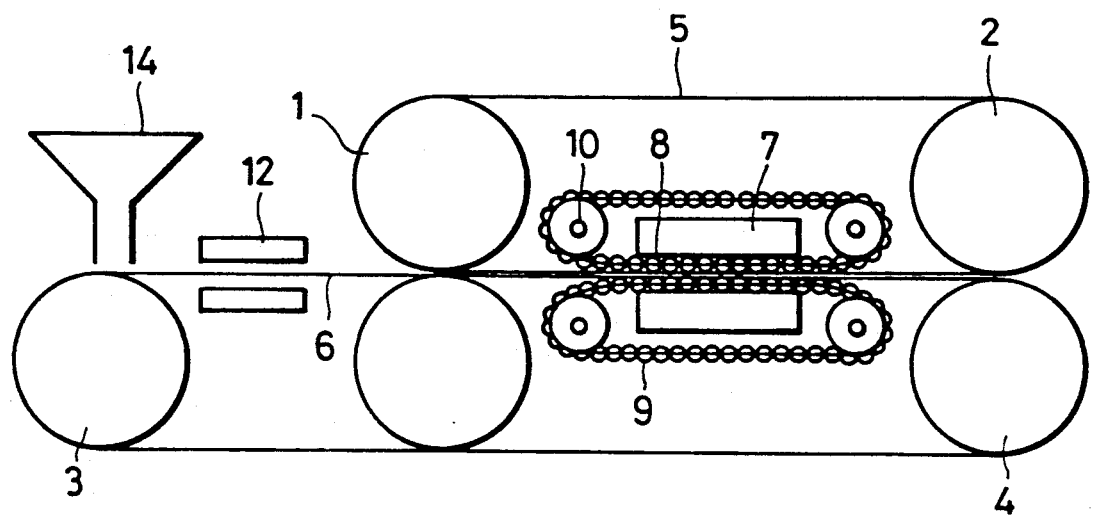
FIG. 1 is a schematic view illustrating the outline of a device which can be used in the practice of the present invention.

The present inventors have intensively researched with the intention of solving the above-mentioned problems, and as a result, they have found that in the case that a specific ultra-high-molecular-weight polyethylene powder is mixed with a specific liquid organic compound and the mixture is then compression-molded by the use of a specific compression device and manner, followed by rolling and drawing, the compression molding can be surprisingly possible under a low pressure. Additionally, in such a case, compression-molded articles having extremely less defect portions can be obtained, and thus a high draw ratio can be achieved in subsequent rolling and drawing steps, which permits obtaining a polyethylene material having high strength and high modulus of elasticity. Moreover, they have found that in such a case, the opposite end portions of the compression-molded article can be uniformly compression-molded, and so yield and production efficiency are higher than in conventional cases.

Now, the present invention will be described in detail.

Preparation of ultra-high-molecular-weight polyethylene powder:

An ultra-high-molecular-weight polyethylene for the preparation of a polyethylene material having high strength and high modulus of elasticity of the present invention has an intrinsic viscosity of 5 to 50 dl/g, preferably 8 to 45 dl/g, more preferably 8 to 40 dl/g in decalin at 135° C, and a viscosity-average molecular weight of 500,000 to 12,000,000, preferably 900,000 to 10,000,000, more preferably 1,200,000 to 8,500,000.

When the intrinsic viscosity is less than 5 dl/g, mechanical properties of drawn articles are poor. Inversely, when it is more than 50 dl/g, workability of compression molding, rolling and drawing deteriorates unpreferably.

Any particular restriction is not put on the shape of the ultra-high-molecular-weight polyethylene, but in usual, it is preferred that the polyethylene is granular or powdery, and the particle diameter of the polyethylene is, for example, 2000 μm or less, preferably from 1 to 2000 μm, more preferably from 10 to 1000 μm or less. Furthermore, it is preferred that a particle diameter distribution of the polyethylene is narrow, because if so, less defect portions are formed in the compression molding step, and uniform sheets or films can be obtained therefrom.

The ultra-high-molecular-weight polyethylene having the above-mentioned specific properties which is used in the present invention can be obtained by the homopolymerization of ethylene or the copolymerization of ethylene and α-olefin in the presence of a catalyst comprising a catalytic component containing at least one of compounds in which transition metal elements in the groups IV to VI of the periodic table are present and, if necessary, an organic metal compound.

The usable α-olefin has 3 to 12 carbon atoms, preferably 3 to 6 carbon atoms. Typical examples of the α-olefin include propylene, butene-1, 4-methylpentene-1, hexene-1, octene-1, decene-1 and dodecene-1. Of these examples, propylene, butene-1, 4-methylpentene-1, hexene-1 are preferable. Furthermore, examples of a comonomer include dienes such as butadiene, 1,4-hexadiene, vinylnorbornene and ethylidene-norbornene, and they may be used in combination. The content of α-olefin in the ethylene-α-olefin copolymer is from 0.001 to 10 mole %, preferably 0.01 to 5 mole%, more preferably 0.1 to 1 mole %.

Typical and suitable examples of the compounds containing transition metal elements in the groups IV to VI of the periodic table which comprise the catalytic component include titanium compounds, vanadium compounds, chromium compounds, zirconium compounds and hafnium compounds. These compounds may be used in combination of plural kinds.

Examples of the titanium compounds include halides, alkoxyhalides, alkoxides and halogenated oxides of titanium, and compounds of tetravalent titanium and trivalent titanium are preferable. Typical examples of the tetravalent titanium compounds include those represented by the general formula $$Ti(OR)_n X_{4-n}$$

wherein R is an alkyl group, or an aralkyl group having 1 to 20 carbon atoms, preferably 1 to 12 carbon atoms, X is a halogen atom, and n is $0 \leq n \leq 4$, and in particular, titanium tetrachloride is preferable.

An example of the trivalent titanium compound includes titanium trihalide such as titanium trichloride, and other examples of the trivalent titanium compounds include those which can be obtained by reducing tetravalent alkoxytitanium halides represented by the general formula $$Ti(OR)_m X_{4-m}$$

wherein R is an alkyl group having 1 to 20 carbon atoms, an aryl group or an aralkyl group, X is a halogen atom, and m is $0 \leq m \leq 4$, with an organic metal compound of a metal in the groups I to III of the periodic table.

Of these titanium compounds, particularly preferable ones are the compounds of tetravalent titanium.

Examples of the vanadium compound include halides, alkoxyhalides, alkoxides and halogenated oxides of vanadium. Typical examples of the vanadium compound include vanadium tetrahalide such as vanadium tetrachloride, a compound of tetravalent vanadium such as tetraethoxyvanadium, compounds of pentavalent vanadium such as vanadium oxytrichloride, ethoxydichlorovanadium, triethoxyvanadium and tributoxyvanadium, and compounds of trivalent vanadium such as vanadium trichloride and vanadium triethoxide.

The above-mentioned titanium compound or vanadium compound may be treated with one or more of electron-donating compounds. Examples of the electron-donating compounds include ethers, thioethers, thiolphosphines, stibines, arsines, amines, amides, ketones and esters.

The titanium compound or the vanadium compound may be used together with a magnesium compound. Examples of the jointly usable magnesium compound include metallic magnesium, magnesium hydroxide, magnesium carbonate, magnesium oxide, magnesium fluoride, magnesium chloride, magnesium bromide, magnesium iodide; double salts, double oxides, carbonates, chlorides and hydroxides containing a magnesium atom and a metal selected from silicon, aluminum and calcium; those which can be obtained by treating or reacting these inorganic solid compounds with an oxygen-containing compound, a sulfur-containing compound, an aromatic hydrocarbon or a halogen-containing material; and oxides containing silicon or aluminum and the above-mentioned magnesium compounds.

In the case that the titanium compound or the vanadium compound is used together with the magnesium compound, any particular restriction is not put on a contact manner of both the compounds and therefore a known manner can be employed.

Examples of the oxygen-containing compound include water, organic oxygen-containing compounds such as alcohols, phenols, ketones, aldehydes, carboxylic acids, esters, polysiloxanes and acid amides, and inorganic oxygen-containing compounds such as metal alkoxides and oxychlorides of metals. Examples of the sulfur-containing compound include organic sulfur-containing compound such as thiols and thioethers, and inorganic sulfur-containing compounds such as sulfur dioxide, sulfur trioxide and sulfuric acid. Examples of the aromatic hydrocarbon include various monocyclic and polycyclic aromatic hydrocarbons such as benzene, toluene, xylene, anthracene and phenanthrene. Moreover, examples of the halogen containing material include chlorine and compounds such as hydrogen chloride, metal chlorides and organic halides.

Another example of the catalyst system is a catalyst obtained by combining an organic aluminum compound with a reaction product of the titanium compound and an organic magnesium compound such as the so-called Grignard compound.

A further other example of the catalyst system is a catalyst obtained by combining an organic aluminum compound with a solid material which can be prepared by bringing an inorganic oxide such as $SiO_2$ or $Al_2O_3$ into contact with the above-mentioned solid catalyst component containing magnesium and titanium.

In these catalyst systems, the titanium compound can be used as an adduct with an organic carboxylic acid ester, and the above-mentioned inorganic solid compound containing magnesium can be used after subjected to a contact treatment with an organic carboxylic acid ester. Furthermore, the organic aluminum compound can be used as an adduct with an organic carboxylic acid ester without any problem. In every case, the catalyst prepared in the presence of an organic carboxylic acid ester can be utilized without any problem.

A typical example of the chromium compound catalyst is what is called the Phillips catalyst in which chromium trioxide or a compound capable of partially forming chromium oxide by calcination is supported on an inorganic oxide carrier. Examples of the inorganic oxide carrier include silica, alumina, silica-alumina, titania, zirconia and thoria and mixtures thereof, and above all, silica and silica-alumina are preferable.

Examples of the chromium compound which can be supported on the carrier include oxides of chromium and compounds of at least partially forming chromium oxide by calcination, for example, halides, oxyhalides, nitrates, acetates, sulfates and alcoholates of chromium. Typical examples of the chromium compound include chromium trioxide, chromium chloride, potassium dichromate, ammonium chromate, chromium nitrate, chromium acetate, chromacetylacetonato and ditertiary butyl chromate.

The chromium compound can be supported on the carrier in a known manner such as impregnation, distillation removal of a solvent or sublimation, and so a suitable supporting manner can be selected in compliance with the kind of chromium compound to be used. The amount of chromium to be supported is from 0.1 to 10% by weight, preferably from 0.3 to 5% by weight, more preferably from 0.5 to 3% by weight with respect to the weight of the carrier in terms of a chromium atom.

The carrier on which the chromium compound has been supported in the above-mentioned manner is then calcined so as to activate the same. The activation by the calcination is usually carried out in a substantially water-free non-reducing atmosphere, for example, in the presence of oxygen, but it may be effected in the presence of an inert gas or under reduced pressure. Preferably, dried air is used. The calcination is carried out at a temperature of 450° C or more, preferably 500 to 900° C for an interval of from several minutes to several hours, preferably from 0.5 to 10 hours. The activation is preferably carried out using plenty of dried air, e.g., under a dried air flow condition.

At the time of the supporting treatment or the calcination, the activation can be adjusted in a known manner, for example, by adding a titanate or a salt containing fluorine. Furthermore, the catalyst supporting the chromium compound may be reduced with carbon monoxide, ethylene or organic aluminum prior to its using.

Examples of the zirconium compound and the hafnium compound include zirconium compounds and hafnium compounds in which a group having a conjugated π electron is present as a ligand, and typical examples thereof are compounds represented by the general formula

wherein M is a zirconium atom or a hafnium atom; each of $R^1$, $R^2$, $R^3$ and $R^4$ is a hydrocarbon residue having 1 to 20 carbon atoms, a halogen atom or a hydrogen atom, and at least one of $R^1$, $R^2$, $R^3$ and $R^4$ is the hydrocarbon residue; and a, b, c and d are values which meet the condition formula of $a+b+c+d=4$. Preferable examples of the hydrocarbon residue in the formula include an alkyl group, an aryl group, a cycloalkyl group, an aralkyl group, an alkoxy group, a cycloalkadienyl group, a sulfur-containing hydrocarbon residue, a nitrogen-containing hydrocarbon residue and a phosphorus-containing hydrocarbon residue.

Examples of the above-mentioned alkyl group include methyl, ethyl, propyl, isopropyl, butyl, hexyl, octyl, 2-ethylhexyl, decyl and oleyl groups; and examples of the aryl group include phenyl and tolyl groups; examples of the cycloalkyl group include cyclopentyl, cyclohexyl, cyclooctyl, norbornyl and bicyclononyl groups; and examples of the aralkyl group include benzyl and neophyl groups.

Examples of the cycloalkadienyl group include cyclopentadienyl, methylcyclopentadienyl, ethylcyclopentadienyl, dimethylcyclopentadienyl, indenyl and tetrahydroindenyl groups; and examples of the alkoxy group include methoxy, ethoxy, propoxy and butoxy groups. Examples of the sulfur-containing hydrocarbon residue include thioethyl and thiophenyl groups; and examples of the nitrogen-containing hydrocarbon residue include dimethylamide, diethylamide and dipropylamide groups.

Other examples of the above-mentioned hydrocarbon residue include unsaturated fatty residues such as vinyl, allyl, propenyl, isopropenyl and 1-butenyl groups, and an unsaturated alicyclic group such as a retarohexenyl group. Examples of the halogen atom include fluorine, chlorine and bromine.

Needless to say, the above-mentioned zirconium compound or hafnium compound can be used by supporting the compound itself on the aforesaid inorganic oxide carrier.

One example of the organic metallic compound used in the method for the preparation of the ultra-high-molecular-weight polyethylene powder of the present invention is an organic metallic compound containing a metal in the groups I to IV of the periodic table which is known as one component of the Ziegler type catalyst. Preferable examples of this organic metallic compound include organic aluminum compounds represented by the general formula $R_nAlX_{3-n}$ (wherein R is an alkyl group having 1 to 20 carbon atoms, an aryl group or an alkoxy group; X is a halogen atom; and n is $0 \geq n \div 3$, and in the case of $N \geq 2$, the respective R's may be identical or different), organic zinc compounds represented by the general formula $R_2Zn$ (wherein R is an alkyl group having 1 to 20 carbon atoms, and both of R's may be identical or different), and mixtures thereof.

Examples of the organic aluminum compound include triethylaluminum, triisobutylaluminum, tri-n-hexyl-aluminum, diethylaluminum chloride, monoethoxydialkyl-aluminum and diethoxymonoalkylaluminum, and compounds represented by the following general formula which can be obtained by reacting trialkylaluminum with water can be also used:

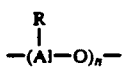

wherein R is a hydrocarbon group having 1 to 18 car atoms, and n is a value of $2 \leq n \leq 100$, preferably $2 \leq n \leq 50$.

Any particular restriction is not put on the amount of the organic metal compound to be used, but usually it is used 0.1 to 1,000 mole times as much as that of the transition metal compound.

The polymerization reaction is carried out in a substantially oxygen-free and water-free condition in a gaseous phase or in the presence of a solvent which is inert to the catalyst or by using the monomer itself as the solvent, and examples of the solvent which is inert to the catalyst include aliphatic hydrocarbons such as butane, isobutane, pentane, hexane, octane, decane and dodecane; alicyclic hydrocarbons such as cyclopentane and cyclohexane; aromatic hydrocarbons such as benzene and toluene; and petroleum fractions. Polymerization temperature is less than the melting point of the ultra-high-molecular-weight polyethylene which will be produced, and it is usually from $-20$ to 110° C., preferably from 0 to 90° C.

When the polymerization temperature is more than the melting point of the ultra-high-molecular-weight polyethylene, a 20 times or more draw ratio cannot be achieved in a subsequent drawing step unpreferably.

Polymerization pressure is usually from 0 to 70 kg/cm$^2$G, preferably from 0 to 60 kg/cm$^2$G The molecular weight of the polymerization product can be adjusted by changing the polymerization temperature, the polymerization pressure, the kind of catalyst, the molar ratio of the catalytic component, the addition of hydrogen to the polymerization system and the like, and any particular restriction is not put on a molecular weight adjustment manner.

Needless to say, a two-stage or multi-stage polymerization in which polymerization conditions such as hydrogen concentration and polymerization temperature are different can also be carried out without any problem.

Thus, the powdery ultra-high-molecular-weight polyethylene can be obtained.

Employment of a liquid organic compound:

A liquid organic compound used in the present invention is an organic compound having a boiling point more than the melting point of the above-mentioned polyethylene powder and a melting point less than the melting point of the polyethylene powder. Here, the "liquid" means that the organic compound is present in a liquid state when mixed with the polyethylene powder.

Any particular restriction is not put on the liquid organic compound, so long as it meets the above-mentioned conditions, whether or not it has such functions as swell and dissolve the polyethylene powder to be used.

Examples of the liquid organic compound having the functions of swelling and dissolving the polyethylene powder to be used include saturated aliphatic hydrocarbon compounds having 9 or more carbon atoms such as nonane, decane and octadecane, mixtures of saturated hydrocarbon compounds called n-paraffins and iso-paraffins, alicyclic hydrocarbons such as decalin and tetralin, aromatic hydrocarbons such as xylene, mesitylene, cumene and cymene, a halogen-substituted aromatic hydrocarbon such as dichlorobenzene, a saturated aliphatic monocarboxylic acid having 3 or more carbon atoms such as stearic acid, and organic acids such as unsaturated aliphatic carboxylic acids. In addition, petroleum fractions having boiling points of 100 to 250° C such as kerosine, various kinds of mineral oils and greases can be also used as the liquid organic compounds.

Furthermore, examples of the liquid organic compounds having no functions of swelling and dissolving the polyethylene powder to be used include polyvalent alcohols such as polyethylene glycol, polypropylene glycol and glycerin.

Moreover, any plasticizers which are used as plasticizers for thermoplastic resins such as vinyl chloride can be also used as the liquid organic compounds, and examples of such compounds include phthalate esters, dibasic esters, inorganic esters, glycol esters, oleic esters, ricinoleic esters, epoxy aliphatic esters, cyclohexene oxides and epichlorohydrin derivatives. Typical examples of these compounds include diethyl phthalate, dibutyl phthalate, dioctyl phthalate, dioctyl adipate, dioctyl azelate, dibutyl sebacate, tricresyl phosphate, tributoxyethyl phosphate and 2-ethylhexyldiphenyl phosphate.

These liquid organic compounds may be used singly or in the form of a mixture thereof.

Of these liquid organic compounds, xylene and decalin are particularly preferred.

Mixing:

A mixing ratio of the liquid organic compound to the polyethylene powder is 2 to 50 parts by weight, preferably 5 to 40 parts, more preferably 10 to 30 parts by weight of the liquid organic compound with respect to 100 parts by weight of the polyethylene powder.

When the amount of the liquid organic compound to be mixed is less than 2 parts by weight, effect is scarcely perceived, and when it is in excess of 50 parts by weight, the liquid organic compound is squeezed out of a mixture with the polyethylene powder in vain.

No particular restriction is put on the manner of mixing the polyethylene powder with the liquid organic compound, and the mixing can be achieved suitably by the use of a known mixer such as a V type mixer, a drum type mixer or a ribbon mixer. However, the manner using a high-speed rotation mixer such as a Henschel mixer is not preferable, because the polyethylene powder is melted by shearing heat. No particular restriction is put on mixing temperature, so long as it is less than the melting point of the polyethylene powder, and it is usually from ordinary temperature to less than its melting point, preferably from ordinary temperature to 70° C. Furthermore, mixing time depends upon the mixing temperature and the kind of liquid organic compound to be used, but it is usually 5 minutes or more, preferably from 10 to 60 minutes. At the time of mixing, it is preferred that the materials are stirred continuously or intermittently.

Moreover, after the mixing and prior to a subsequent compression molding step, the resulting mixture is allowed to stand for 10 hours or more, preferably for 1 day or more, the liquid organic compound being sealed so as not to volatilize.

Compression molding:

Now, the reference will be made to the step where the mixture is compression-molded continuously.

The compression molding in the present invention is achieved by feeding the mixture of the polyethylene powder and the liquid organic compound to between a pair of upper and lower endless belts facing each other, and continuously compression-molding the mixture at a temperature less than the melting point of the mixture by pressing means disposed inside the endless belts, while the mixture is sandwiched and moved by the endless belts. Preferably, each of the aforesaid pressing means disposed inside the endless belts is composed of a pressing plate and a series of rotatable rollers which are linked to each other between the pressing plate and each endless belt.

A device for the compression molding will be briefly described in reference to FIG. 1 in which its embodiment is shown.

This device basically has a pressing means composed of a pair of upper and lower endless belts 5, 6 facing each other which are tensed by rolls 1 to 4, pressing plates 7 for pressing a material mixture via the endless belts, and a series of rotatable rollers 8 linked to each other between the pressing plate and the endless belt.

The pressing means of the present invention is composed of the pressing plates disposed inside the endless belts and the series of rotatable rollers linked to each other between the pressing plate and the endless belt. The series of rotatable rollers linked to each other between the pressing plate and the endless belt are closely arranged so that rotation axes of the rollers may be directed substantially vertically to the moving direction of the endless belts and so that the rollers may not come in contact with each other.

Central axes on the opposite ends of each roller are fixed to a chain 9, and the latter is engaged with sprockets 10 disposed in the front and in the rear of the pressing plate, and it is preferred that the series of rollers are allowed to run at half of the running speed of the endless belts.

The above-mentioned series of rollers may be fixed between the endless belt and the pressing plate, but in this case, frictional force is generated by slip between the rollers and the endless belt and between the rollers and the pressing plate, and therefore the durability of the device is impaired.

Any pressing plate can be used without restriction, so long as its surface which comes in contact with the series of rollers is smooth and it can transmit pressure uniformly.

Figure 2:
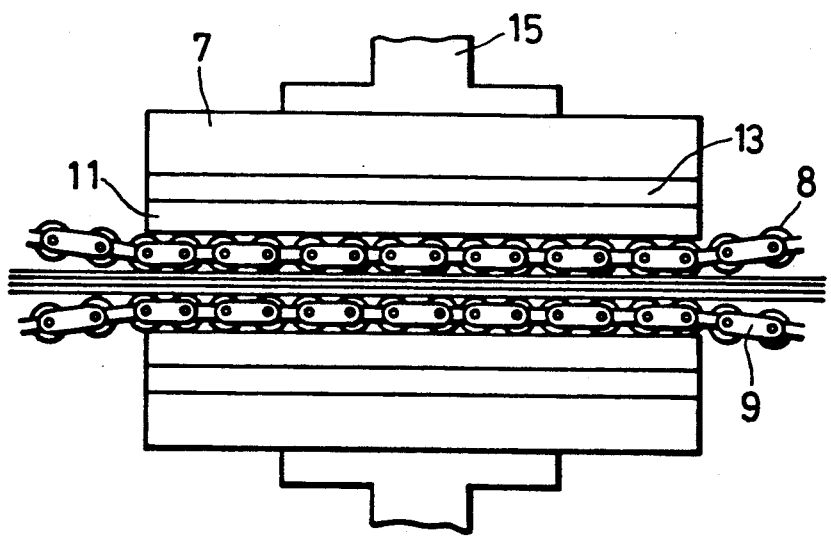
FIG. 2 is an enlarged view of a pressing portion and its vicinities of the device shown in FIG. 1.

The suitable length of the pressing plate in the running direction of the endless belt is usually from 30 to 400 cm, preferably 50 to 200 cm. The average pressure which is applied to the endless belts by the pressing plate should be less than 100 kg/cm$^2$, preferably from 0.1 to 50 kg/cm$^2$, more preferably from 0.5 to 10 kg/cm$^2$, most preferably from 1.0 to 8.0 kg/cm$^2$. The first role of the pressing plate is to press the mixture of the polyethylene powder and the liquid organic compound via the endless belt, but the pressing plate simultaneously plays another role as a means for heating the material to be compressed. In the method of the present invention, the compression is carried out at a temperature less than the melting point of the mixture which is the material to be compressed, and this fact is extremely important to obtain the polyethylene material having high strength and high modulus of elasticity through the subsequent rolling and drawing steps. The temperature in the compression step is usually 50° C. or more, preferably from 90° to 140° C. in the range of less than the melting point of the mixture. Thus, as a means for heating the mixture to be compressed, it is best to directly heat the endless belts in a pressing section. However, as shown in FIG. 2, a heating means 11 may be disposed in the pressing plate, so that the mixture to be compressed can be heated by heat coming from the pressing plates through the rollers and the endless belts, or alternatively as shown in FIG. 1, a preheater 12 may be provided closely to the endless belts so as to heat the mixture, which is practically convenient.

The disposition of the heating means 11 in the pressing plate may be achieved by first providing a heat insulating portion 13, and then embedding an electric heater in the pressing plate, or alternatively by disposing, in the pressing plate, a circulating passage for a heating medium which will be heated.

The continuous manufacture of the high-strength and high-elasticity modulus polyethylene material of the present invention by the use of the shown device can be carried out as follows: In the first place, the mixture of the polyethylene powder and the liquid organic compound is thrown into a hopper 14 and then caused to drop on the lower endless belt.

The running speed of the endless belt should be more than 10 cm/minute, preferably from 50 to 200 cm/minute, depending upon the length of the pressing plate and compression conditions. The mixture on the endless belt is cut so as to have a desired section by a doctor blade and then, if necessary, preheated by the heater. Afterward, the mixture is moved to a pressing section defined by the upper and lower endless belts and further forwarded to a compression section in which the series of rollers and the pressing plates are disposed. Here, the pressure from a hydraulic cylinder (not shown) is communicated from a hydraulic piston 15 to the pressing plate, and then applied as compression force to the mixture via the rollers and the endless belts. At this time, the heat from the heater is simultaneously communicated to the mixture via the rollers and the endless belts, whereby the mixture is maintained at a predetermined temperature.

The thus compression-molded sheet is moved through the rolls and then leaves the endless belts. In this way, the compression-molded sheet is continuously obtained. The compression-molded sheet suitably has a thickness of 2 to 0.2 mm, preferably 1.5 to 0.5 mm.

Rolling:

In the present invention, the polyethylene material having high strength and high modulus of elasticity can be obtained by rolling and drawing the thus compression-molded sheet.

The rolling can be carried out by a known manner, but the molded sheet may be rolled by a pair of pressure rolls having different rotational directions, while the polyethylene is maintained in a solid phase without melting the same, so that a rolled sheet or film is obtained. At this time, a deformation ratio of the material by the rolling operation can be selected in a wide range, and in general, this ratio is from 1.2 to 20, preferably from 1.5 to 10 in terms of a rolling magnification (length of the material after the rolling/that of the material before the rolling). In the rolling operation, the temperature of the material is from 20° C. or more to less than its melting point, preferably from 90° C. or more to less than the melting point. Needless to say, multi-stage rolling is also possible in which the rolling operation is repeated once or more.

Drawing:

After the rolling step:, drawing is carried out, but this drawing can be achieved in various manners. No particular restriction is put on the drawing manner, so long as the objects of the present invention are impaired thereby. As examples of a heating means, there are hot-air drawing, cylinder drawing and hot roll or hot plate drawing. Furthermore, drawing tension can be applied to the material by drawing the material between nip rolls, applying tension thereto between multi-stage rolls, between clover rolls, or drawing the material by the Nelson roll system while the drawing tension is maintained. Any one of these manners can be used, but the most preferable manner comprises applying tension to the material between nip rolls, and drawing the same on the thermal cylinder.

The drawing operation is carried out at a temperature less than the melting point of drawing material, usually 20° to 160° C., preferably 20 to 150° C., more preferably 20 to 140° C. In order to perform the drawing at a high magnification, multi-stage drawing can be used in which the first stage drawing is effected at a temperature of 100° to 140° C., and then subsequent drawing operations are done at a higher temperature than in the first stage drawing step. A drawing speed can be selected suitably, and it is usually in the range of 0.1 to 500 m/minute, preferably 1 to 200 m/minute, more preferably 5 to 150 m/minute. However, taking an economical viewpoint into consideration, the high speed is more preferable, and thus it is desired that the drawing is carried out at a speed of 5 to 200 cm/minute.

When a high drawing magnification is taken, high strength and high modulus of elasticity are obtained. Therefore, it is desired to heighten the drawing magnification as much as possible. However, in the preparation method of the present invention, a total drawing ratio (total drawing ratio of rolling and tensile drawing, i.e., the length of the material after the drawing/that of the material before the drawing) of usually 20 times or more, preferably 60 times or more, more preferably 80 to 200 times is possible, which means that the present invention permits an extremely high draw ratio.

Thus, the polyolefin material having high strength and high modulus of elasticity can be prepared. According to the method of the present invention, in the case that a polyethylene is used as a polyolefin, a polyethylene material having a tensile modulus of 120 GPa or more and a tensile strength of 2 GPa or more can be obtained. As is apparent from this fact, the present invention permits obtaining a polyolefin material having extremely high strength and modulus of elasticity.

Effects of the present invention:

In the method of the present invention, an ultra-high-molecular-weight polyethylene powder is mixed with a small amount of a liquid organic compound, and therefore molding is possible at a low temperature under a low pressure in a compression molding step. It permits using a simple molding device and thus lowering the cost of the device that the molding is possible under the low pressure. Furthermore, it permits lowering the cost of heat energy, expanding a stable temperature region, and ensuring a good operation stability that the molding is possible at the low temperature. In steps of compression, rolling and drawing, pressure and heat are diffused more uniformly than in the case of no liquid, and a certain kind of liquid functions as a plasticizer, so that the material of the present invention is excellent in workability and sheets obtained therefrom have less defect portions. In consequence, a line speed can be accelerated, productivity can be increased, and the drawing can be achieved at a high magnification, whereby products can have high strength and high modulus of elasticity and the yield of the products can be also enhanced in all the steps. Moreover, when a volatile liquid organic compound is used, most of the compound is volatilized in a compression molding step, because a small amount of the compound is only used. Even if the compound remains slightly, it is volatilized completely in a subsequent rolling step or tensile drawing step. Therefore, the step for removing the solvent is unnecessary, which is very economical.

EXAMPLES

Now, the present invention will be described in more detail in reference to examples, but the present invention should not be limited to these examples.

In the examples and comparative examples, some physical properties are measured as follows:

Melting point

About 5 mg of a sample was weighed accurately, and it was then set on a DSC device, followed by temperature rise at 5° C./minute. A temperature at which the top of a maximum peak was present was regarded as a melting point.

Modulus of elasticity and strength

Modulus of elasticity and strength were measured at a temperature of 23° C. by the use of a Strograph R. The length of a sample which would be nipped by a clamp was 150 mm and an extension speed was 100 mm/minute. The modulus of elasticity was calculated from a value of stress at a strain of 0.1%. The sectional area of the sample which is necessary for the calculation was obtained by measuring the weight and length of the sample on condition that the density of polyethylene was regarded as 1 g/cm$^3$.

Drawing properties

Furthermore, drawing properties were ranked into the following 4 classes on the basis of material cut numbers in the tensile drawing step:

ⓞ good, ○ slightly good, Δ slightly bad, and X bad.

EXAMPLE 1

| Specifications of molding machine: | | | | |
|---|---|---|---|---|
| 1. Roll | diameter | 500 mm | length | 300 mm |
| 2. Steel belt | wall thickness | 0.6 mm | width | 200 mm |
| 3. Small aperture roller | diameter | 12 mm | length | 250 mm |
| 4. Pressing plate | length | 1000 mm | width | 200 mm |
| 5. Hydraulic cylinder | diameter | 125 mm | | |

To 100 parts by weight of an ultra-high-molecular-weight polyethylene having an intrinsic viscosity of 16.6 dl/g in decalin at 135° C. was added 30 parts by weight of decalin, and they were then mixed for 20 minutes by the use of a V type blender. The resulting mixture was placed in a vessel with a lid and then allowed to stand for one week. Afterward, the mixture was heated up to 130° C., and then pressed under an average pressure of 6 kg/cm$^2$ by means of the above-mentioned compression molding machine, whereby a sheet having a thickness of 1.1 mm and a width of 100 mm was continuously compression-molded at a velocity of 1 m/minute.

Next, this sheet was fed to between a pair of rolls having a controlled surface temperature of 140° C., a diameter of 150 mm, a length of 300 mm and a roll spacing of 30 μm, the respective rolls being rotated mutually in a reverse direction at the same peripheral speed of 1 m/minute, and rolling was then carried out in order to obtain a film in a draw ratio of 5 times. The thus rolled film was slit so that the width of the film might be 1 mm, and it was then drawn at a temperature of 135° C. in a draw ratio of 20 times by the use of a hot roll type drawing device having a roll diameter of 250 mm, the peripheral speed of the low-speed roll being 0.6 m/minute, that of the high-speed roll being 12 m/minute. During the tensile drawing step, the film was scarcely cut, which meant that the drawing properties of the film were good. For the resulting fiber, modulus of elasticity and strength were measured, and the results are set forth in Table 1. In this connection, the melting point of the ultra-high-molecular-weight polyethylene was 141.9° C., and the melting point of its mixture with decalin was 135.2° C.

EXAMPLE 2

The same procedure as in Example 1 was effected except that the amount of decalin was 10 parts by weight. The results of tensile drawing properties and physical properties of an obtained fiber are set forth in Table 1. Here, the melting point of a mixture was 136.1° C.

EXAMPLE 3

The same procedure as in Example 1 was effected except that an ultra-high-molecular-weight polyethylene having an intrinsic viscosity of 18.7 dl/g was used. The results of drawing properties in a tensile drawing step and physical properties of an obtained fiber are set forth in Table 1. Here, melting points of the ultra-high-molecular-weight polyethylene and its mixture with decalin were 142.6° C and 136.5° C, respectively.

EXAMPLE 4

The same procedure as in Example 1 was effected except that decalin was replaced with 30 parts by weight of a liquid paraffin. The results of drawing properties in a tensile drawing step and physical properties of an obtained fiber are set forth in Table 1. Here, the melting point of a mixture with the liquid paraffin was 138.4° C.

EXAMPLE 5

The same procedure as in Example 1 was effected except that compression molding was carried out at a temperature of 110° C., the wall thickness of a sheet was 0.7 mm, and tensile drawing was done first at a temperature of 130° C. in a draw ratio of 11 times (the peripheral speed of the low-speed roll was 0.5 m/minute and that of the high-speed roll was 5.5 m/minute) and then at a temperature of 150° C. in a draw ratio of 2.4 times (the peripheral speed of the low-speed roll was 5.5 m/minute and that of the high-speed roll was 13.2 m/minute), the total draw ratio being 26 times. The results of drawing properties in a tensile drawing step and physical properties of an obtained fiber are set forth in Table 1.

EXAMPLE 6

The same procedure as in Example 5 was effected except that decalin was replaced with 20 parts by weight of decalin and 10 parts by weight of polyethylene glycol. Until a rolling step, a sheet could be stably formed in all the same way as in Example 5, but drawing properties were slightly bad.

The results of drawing properties as well as modulus of elasticity and tensile strength of a drawn material are set forth in Table 1.

Here, the melting point of a mixture with polyethylene glycol was 140.3° C.

EXAMPLE 7

The same procedure as in Example 5 was effected except that decalin was replaced with 30 parts by weight of dioctyl adipate. Until a rolling step, a sheet could be stably formed in all the same way as in Example 5, but drawing properties were slightly bad.

The results of drawing properties as well as modulus of elasticity and tensile strength of a drawn material are set forth in Table 1.

Here, the melting point of a mixture with dioctyl adipate was 142.2° C.

EXAMPLE 8

The same procedure as in Example 1 was effected except that an ultra-high-molecular-weight polyethylene having an intrinsic viscosity of 39.0 dl/g was used and a draw ratio was 6 times. The results of drawing properties and physical properties of an obtained material are set forth in Table 1.

EXAMPLE 9

The same procedure as in Example 8 was effected except that the amount of decalin was 7 parts by weight. The results of drawing properties and physical properties of an obtained material are set forth in Table 1.

EXAMPLE 10

The same procedure as in Example 1 was effected except that an ultra-high-molecular-weight polyethylene having an intrinsic viscosity of 11.5 dl/g was used. The results of drawing properties and physical properties of an obtained material are set forth in Table 1.

COMPARATIVE EXAMPLE 1

The same procedure as in Example 1 was effected except that decalin was not used. In this case, the material was often cut in a tensile drawing step, and drawing properties were bad. The results of physical properties of an obtained fiber are set forth in Table 1.

COMPARATIVE EXAMPLE 2

The same mixture as in Example 1 was molded at a temperature of 130° C. under a pressure of 5 kg/cm² for a press time of 10 minutes by the use of a press molding machine in order to form a sheet having a wall thickness of 1.1 mm, and the latter was then rolled 5 times under the same rolling conditions as in Example 1. The rolled sheet was slit so that its width might be 1mm, and then drawn at 135° C. at a crosshead speed of 500 mm/minute by means of a tensile test device with a thermostatic tank, but at this time, a draw ratio was as low as 10 times. The results of physical properties of an obtained fiber are set forth in Table 1.

COMPARATIVE EXAMPLE 3

The same procedure as in Example 5 was effected except that no decalin was used, but the resulting sheet was too brittle to be rolled.

TABLE 1

| | Intrinsic Viscosity of Polyethylene (dl/g) | Liquid Organic Compound (kind) | Amount (pts. wt.) | Rolling Ratio (times) |
|---|---|---|---|---|
| Example 1 | 16.6 | Decalin | 30 | 5 |
| Example 2 | 16.6 | Decalin | 10 | 5 |
| Example 3 | 18.7 | Decalin | 30 | 5 |
| Example 4 | 16.6 | Liquid Paraffin | 30 | 5 |
| Example 5 | 16.6 | Decalin | 30 | 5 |
| Example 6 | 16.6 | Decalin / Polyethylene Glycol | 30 / 10 | 5 |
| Example 7 | 16.6 | Dioctyl Adipate | 30 | 5 |
| Example 8 | 39.0 | Decalin | 30 | 6 |
| Example 9 | 39.0 | Decalin | 7 | 6 |
| Example 10 | 11.5 | Decalin | 30 | 5 |
| Comp. Ex. 1 | 16.6 | None | — | 5 |
| Comp. Ex. 2 | 16.6 | Decalin | 30 | 5 |
| Comp. Ex. 3 | 16.6 | None | — | Impossible |

| | Tensile Draw Ratio (times) | Total Draw Ratio (times) | Drawing Properties | Modulus of Elasticity (GPa) | Strength (GPa) |
|---|---|---|---|---|---|
| Example 1 | 20 | 100 | ⊚ | 130 | 3.5 |
| Example 2 | 20 | 100 | ○ | 117 | 2.9 |
| Example 3 | 20 | 100 | ○ | 145 | 3.0 |
| Example 4 | 20 | 100 | △ | 115 | 2.7 |
| Example 5 | 11 × 2.5 (26) | 130 | ⊚ | 150 | 4.1 |
| Example 6 | 19 (11 × 1.7) | 95 | △ | 112 | 2.8 |
| Example 7 | 17 (9 × 2.1) | 85 | △ | 102 | 2.1 |
| Example 8 | 15 | 90 | ○ | 120 | 3.1 |
| Example 9 | 18 | 108 | ⊚ | 135 | 3.8 |
| Example 10 | 20 | 100 | ○ | 120 | 2.8 |
| Comp. Ex. 1 | 20 | 100 | X | 120 | 3.0 |
| Comp. Ex. 2 | 10 | 50 | — | 90 | 2.3 |
| Comp. Ex. 3 | — | — | — | — | — |

What is claimed is:

1. A method for the continuous preparation of a polyethylene having high strength and high modulus of elasticity which comprises the steps of mixing 100 parts by weight of an ultra-high-molecular-weight polyethylene powder having an intrinsic viscosity of 5 to 50 dl/g in decalin at 135° C. with 2 to 50 parts by weight of a liquid organic compound having a boiling point higher than the melting point of said polyethylene at a temperature less than the melting point of said polyethylene powder, feeding the resulting mixture to between a pair of upper and lower endless belts facing each other, continuously compression-molding said mixture at a temperature less than the melting point of said mixture by the use of pressing means disposed inside said endless belts, while said mixture is sandwiched and moved by said endless belts, and rolling and then drawing the same.

2. A method for the preparation of a polyethylene material according to claim 1 wherein each of said pressing means disposed inside said endless belts is composed of a pressing plate and a series of rotatable rollers linked to each other disposed between said pressing plate and said endless belt.

3. A method for the preparation of a polyethylene material according to claim 1 wherein said liquid organic compound is a compound having functions of swelling and dissolving said polyethylene powder which is selected from the group consisting of saturated aliphatic hydrocarbons having 9 or more carbon atoms, mixtures of saturated hydrocarbon compounds, alicyclic hydrocarbons, aromatic hydrocarbons, halogen-substituted aromatic hydrocarbons, saturated or unsaturated aliphatic carboxylic acids having 3 or more carbon atoms, petroleum fractions having boiling points of 100 to 250° C., mineral oils and greases.

4. A method for the preparation of a polyethylene material according to claim 3 wherein said saturated aliphatic hydrocarbon is nonane, decane or octadecane.

5. A method for the preparation of a polyethylene material according to claim 3 wherein said mixture of saturated hydrocarbon compounds is a mixture of an n-paraffin and an iso-paraffin.

6. A method for the preparation of a polyethylene material according to claim 3 wherein said alicyclic hydrocarbon is decalin or tetralin.

7. A method for the preparation of a polyethylene material according to claim 3 wherein said aromatic hydrocarbon is xylene, mesitylene, cumene or cymene.

8. A method for the preparation of a polyethylene material according to claim 3 wherein said halogen-substituted aromatic hydrocarbon is dichlorobenzene.

9. A method for the preparation of a polyethylene material according to claim 3 wherein said saturated aliphatic monocarboxylic acid is stearic acid.

10. A method for the preparation of a polyethylene material according to claim 3 wherein said petroleum fraction is kerosine.

11. A method for the preparation of a polyethylene material according to claim 1 wherein said liquid organic compound is a polyvalent alcohol or a plasticizer for a thermoplastic resin which has no function of swelling said polyethylene powder.

12. A method for the preparation of a polyethylene material according to claim 11 wherein said polyvalent alcohol is polyethylene glycol, polypropylene glycol or glycerin.

13. A method for the preparation of a polyethylene material according to claim 11 wherein said plasticizer is one selected from the group consisting of phthalate esters, dibasic esters, inorganic esters, glycol esters, oleic esters, ricinoleic esters, epoxy aliphatic esters, cyclohexene oxides and epichlorohydrin derivatives.

14. A method for the preparation of a polyethylene material according to claim 1 wherein said plasticizer is one selected from the group consisting of diethyl phthalate, dibutyl phthalate, dioctyl phthalate, dioctyl adipate, dioctyl azelate, dibutyl sebacate, tricresyl phosphate, tributoxyethyl phosphate and 2-ethylhexyl-diphenyl phosphate.

15. A method for the preparation of a polyethylene material according to claim 11 wherein the particle diameter of said ultra-high-molecular-weight polyethylene powder is 2000 $\mu$m or less.

16. A method for the preparation of a polyethylene material according to claim 1 wherein said ultra-high-molecular-weight polyethylene is what is obtained by the homopolymerization of ethylene or the copolymerization of ethylene and $\alpha$-olefin in the presence of a catalyst comprising a catalytic component containing at least one of compounds in which transition metal elements in the groups IV to VI of the periodic table are present and, if necessary, an organic metal compound.

17. A method for the preparation of a polyethylene material according to claim 16 wherein said $\alpha$-olefin has 3 to 12 carbon atoms.

18. A method for the preparation of a polyethylene material according to claim 17 wherein said $\alpha$-olefin is one selected from the group consisting of propylene, butene-1, 4-methylpentene-1, hexene-1, octene-1, decene-1 and dodecene-1.

19. A method for the preparation of a polyethylene material according to claim 16 wherein in said copolymer of ethylene and said $\alpha$-olefin, the content of said $\alpha$-olefin is from 0.001 to 10 mole %.

20. A method for the preparation of a polyethylene material according to claim 2 wherein in said compression molding step, an average pressure which is applied to said endless belts by said pressing plate is from 0.1 to 20 kg/cm$^2$.

21. A method for the preparation of a polyethylene material according to claim 1 wherein in said compression molding step, the temperature of said material to be pressed is in the range of 50° to 140° C.

22. A method for the preparation of a polyethylene material according to claim 1 wherein the thickness of said compression-molded sheet is from 0.2 to 2 mm.

23. A method for the preparation of a polyethylene material according to claim 1 wherein in said rolling step, a rolling ratio is from 1.2 to 20 in terms of a ratio of the length of said sheet before said rolling to that of said sheet after said rolling.

24. A method for the preparation of a polyethylene material according to claim 1 wherein in said drawing step, a drawing temperature is from 20° to 150° C.

* * * * *

UNITED STATES PATENT AND TRADEMARK OFFICE
CERTIFICATE OF CORRECTION

PATENT NO. : 5,106,558
DATED : April 21, 1992
INVENTOR(S) : Seizo Kobayashi et al.

It is certified that error appears in the above-identified patent and that said Letters Patent is hereby corrected as shown below:

On the Title page, item [73] Assignee, third party should be --Polymer Processing Research Institute Ltd.--

Signed and Sealed this

Twentieth Day of July, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,106,558
DATED : April 21, 1992
INVENTOR(S) : SEIZO KOBAYASHI ET AL It is certified that error appears in the above-identified patent and that said Letters Patent is hereby corrected as shown below:

On the title page, item [75]:

The first inventor's name should be --Seizo--, not "Keizo".

Signed and Sealed this

Twenty-third Day of November, 1993

Attest:

BRUCE LEHMAN

*Attesting Officer*    *Commissioner of Patents and Trademarks*